United States Patent [19]
Gupta et al.

[11] Patent Number: 5,475,858
[45] Date of Patent: Dec. 12, 1995

[54] REAL TIME MULTIPROCESSOR SYSTEM HAVING A WRITE ONLY DATA LINK CONNECTED TO ONE OF THE PORTS OF THE MEMORY OF EACH OF THE PROCESSOR NODES

[75] Inventors: Anil Gupta, Plantation; Walter T. Nixon, North Lauderdale; Hugh M. Humphreys, Coral Springs, all of Fla.

[73] Assignee: Encore Computer, U.S., Inc., Fort Lauderdale, Fla.

[21] Appl. No.: 402,763

[22] Filed: Mar. 13, 1995

Related U.S. Application Data

[63] Continuation of Ser. No. 857,580, Mar. 25, 1992, abandoned.

[51] Int. Cl.$^6$ .................................................. G06F 13/00
[52] U.S. Cl. .................. 395/800; 395/475; 395/476; 364/931.4; 364/229; 364/243; 364/DIG. 1
[58] Field of Search ...................................... 395/800, 200, 395/325, 250, 425, 200.07, 284, 475, 476; 340/825.05

[56] References Cited

U.S. PATENT DOCUMENTS

| | | | |
|---|---|---|---|
| 4,363,093 | 12/1982 | Davis et al. | 395/200 |
| 4,394,726 | 7/1983 | Kohl | 395/550 |
| 4,396,983 | 8/1983 | Segarra et al. | 395/200 |
| 4,604,683 | 8/1986 | Russ et al. | 395/325 |
| 4,833,625 | 5/1989 | Fisher et al. | 395/139 |
| 4,914,570 | 4/1990 | Peacock | 395/650 |
| 4,991,079 | 2/1991 | Dann | 395/200 |
| 5,010,515 | 4/1991 | Torborg, Jr. | 395/163 |
| 5,117,350 | 5/1992 | Parrish et al. | 395/425 |
| 5,146,607 | 9/1992 | Sood et al. | 395/800 |
| 5,237,670 | 8/1993 | Wakerly | 395/425 |
| 5,247,629 | 9/1993 | Casamatta et al. | 395/400 |

Primary Examiner—Thomas G. Black
Assistant Examiner—Paul Harrity
Attorney, Agent, or Firm—Keck, Mahin & Cate

[57] ABSTRACT

A real time data processing system consisting of a plurality of processing nodes and a write only reflective data link for transferring information containing writes only between the plurality or processing nodes. All the nodes include a bus, a processor coupled to the bus, a memory having at least two ports with one port connected to the bus and the other port connected to the data link and a sensor for sensing a write to the memory. At least one node has a VMEbus as the bus and serves as an I/O connected to one port of the memory. Further a local bus included for inputting and outputting from the memory. The local bus is connected to a third port of the memory.

10 Claims, 12 Drawing Sheets

| ADDRESS | | | |
|---|---|---|---|
| 0000 ⋮ 003F | BOARD ID PROM | | ACCESS READ ONLY |
| | ID 0 | | |
| | ID 31 | | |

| ADDRESS | MEMORY BASE ADDRESSES | ACCESS |
|---|---|---|
| 0040 | LOCAL BUS BASE ADDRESS | R/W |
| 0042 | VMEBUS BASE ADDRESS | R/W |

| ADDRESS | MC BUS CONTROL/STATUS REGISTER | ACCESS |
|---|---|---|
| 0044 | VMEBUS INTERRUPT CONTROL REGISTER | R/W |
| 0046 | TRANSMIT WINDOW RAM ADDRESS REGISTER | R/W |
| 0048 | TRANSMIT WINDOW RAM DATA REGISTER | R/W |
| 004A | RECEIVE WINDOW RAM ADDRESS REGISTER | R/W |
| 004C | RECEIVE WINDOW RAM DATA REGISTER | R/W |
| 004E | MC CONTROL REGISTER-0 | R/W |
| 0050 | MC CONTROL REGISTER-1 | R/W |
| 0052 | MC STATUS REGISTER | R |
| 0054 | NODE ID REGISTER | R/W |
| 0056 | MAILBOX-0 | R/W |
| 0058 | MAILBOX-1 | R/W |
| 005A | DIAGNOSTIC CSR | R/W |

FIG.10

| BYTE LOC. | FIELD NAME | CONTENT | COMMENT |
|---|---|---|---|
| 0x0000<br>0x0002 | PROM SIZE <15 ..8><br>PROM SIZE <07 ..0> | 0X0<br>0X20 | 32 BYTE |
| 0x0004 | PROM TYPE | 0x1 | SIGNETICS 82s123 |
| 0x0006 | BOARD TYPE MODIFIER | 0x0 FOR BOARD TYPE 160-113258-001 &<br>160-113258-002<br>0x1 FOR BOARD TYPE 160-113258-003 &<br>160-113258-004 | |
| 0x0008<br>0x000A | BOARD TYPE <15 ..8><br>BOARD TYPE <07 ..0> | 0x0<br>0x5 | |
| 0x000C<br>0x000E | ASSEMBLY ID <15 ..8><br>ASSEMBLY ID <07 ..0> | 0x03<br>0x20 | |
| 0x0010<br>0x0012 | MAJOR ASSY REV <15 ..8><br>MAJOR ASSY REV <07 ..0> | 0x00<br>0x31 | |
| 0x0014<br>0x0016 | MINOR ASSY REV <15 ..8><br>MINOR ASSY REV <07 ..0> | 0x00<br>0x00 | MINOR REV |
| 0x0018<br>0x001A<br>0x001C<br>0x001E | Bd SERIAL NUMBER <31 ..24><br>Bd SERIAL NUMBER <23 ..16><br>Bd SERIAL NUMBER <15 ..08><br>Bd SERIAL NUMBER <07 ..00> | PER BOARD<br>PER BOARD<br>PER BOARD<br>PER BOARD | |
| 0x0020<br>0x0022 | MEMORY SIZE <15 ..8><br>MEMORY SIZE <07 ..0> | 0x00<br>0x04 FOR BOARD TYPE 160-113258-001 &<br>160-113258-003<br>0x10 FOR BOARD TYPE 160-113258-002 &<br>160-113258-004 | |
| 0x0024 | MEMORY SPEED (NANOSECOND) | 0x50 | 80 ne |
| 0x0026 | CLOCK SPEED (1=20,2=25) | 0x02 | 25MHz CPU |
| 0x0028<br>0x002A<br>0x002C<br>0x002E | UNUSED<br>UNUSED<br>UNUSED<br>UNUSED | 0x00<br>0x00<br>0x00<br>0x00 | |
| 0x0030<br>0x0032<br>0x0034<br>0x0036 | ATE TEST PATTERN<br>ATE TEST PATTERN<br>ATE TEST PATTERN<br>ATE TEST PATTERN | 0x00<br>0x55<br>0xAA<br>0xFF | |
| 0x0038<br>0x003A<br>0x003C<br>0x003E | CHECKSUM <31 ..24><br>CHECKSUM <23 ..16><br>CHECKSUM <15 ..08><br>CHECKSUM <07 ..00> | GENERATED BY PROG.<br>GENERATED BY PROG.<br>GENERATED BY PROG.<br>GENERATED BY PROG. | |

REAL TIME MULTIPROCESSOR SYSTEM HAVING A WRITE ONLY DATA LINK CONNECTED TO ONE OF THE PORTS OF THE MEMORY OF EACH OF THE PROCESSOR NODES

This is a continuation of application Ser. No. 07/857,580, filed Mar. 25, 1992, now abandoned.

FIELD OF THE INVENTION

This invention relates to a novel real time data processing system including two or more data processing nodes or units wherein as data is written to a memory in one mode, it is sensed and reflected to memories in the associated nodes.

BACKGROUND OF THE INVENTION

Such systems are known from U.S. Pat. No. 4,991,079, the content of which is here incorporated by reference and from U.S. Ser. No. 07/403,779, filed Sep. 8, 1989, continuation of Ser. No. 06/880,222 filed Jun. 30, 1986, now abandoned, the content of which is here incorporated by reference, both of which are commonly owned with the present application. Such systems use two ported memories. Although they are successful in reflecting data among a plurality of nodes, these systems have limitations which will become more readily apparent from the following description.

SUMMARY OF THE INVENTION

The present invention provides a data processing system characterized by an architecture that provides efficient coupling of multiple processor nodes for real-time applications. This architecture allows data to be shared among different processing nodes in a distributed computing system via a parallel, high speed real-time linkage between the physical memories of the nodes. It also provides the full advantages of the common memory, but without the non-deterministic access latencies that are found in most traditional multiprocessor systems with shared memories.

Other and further advantages of the present invention will become readily evident from the following description of a preferred embodiment when considered in conjunction with the appended drawings.

BRIEF DESCRIPTION OF THE DRAWINGS

FIGS. 10 and 11 shown the MC system control/status register map and ID registers.

DETAILED DESCRIPTION OF PREFERRED EMBODIMENT

Figure 1:
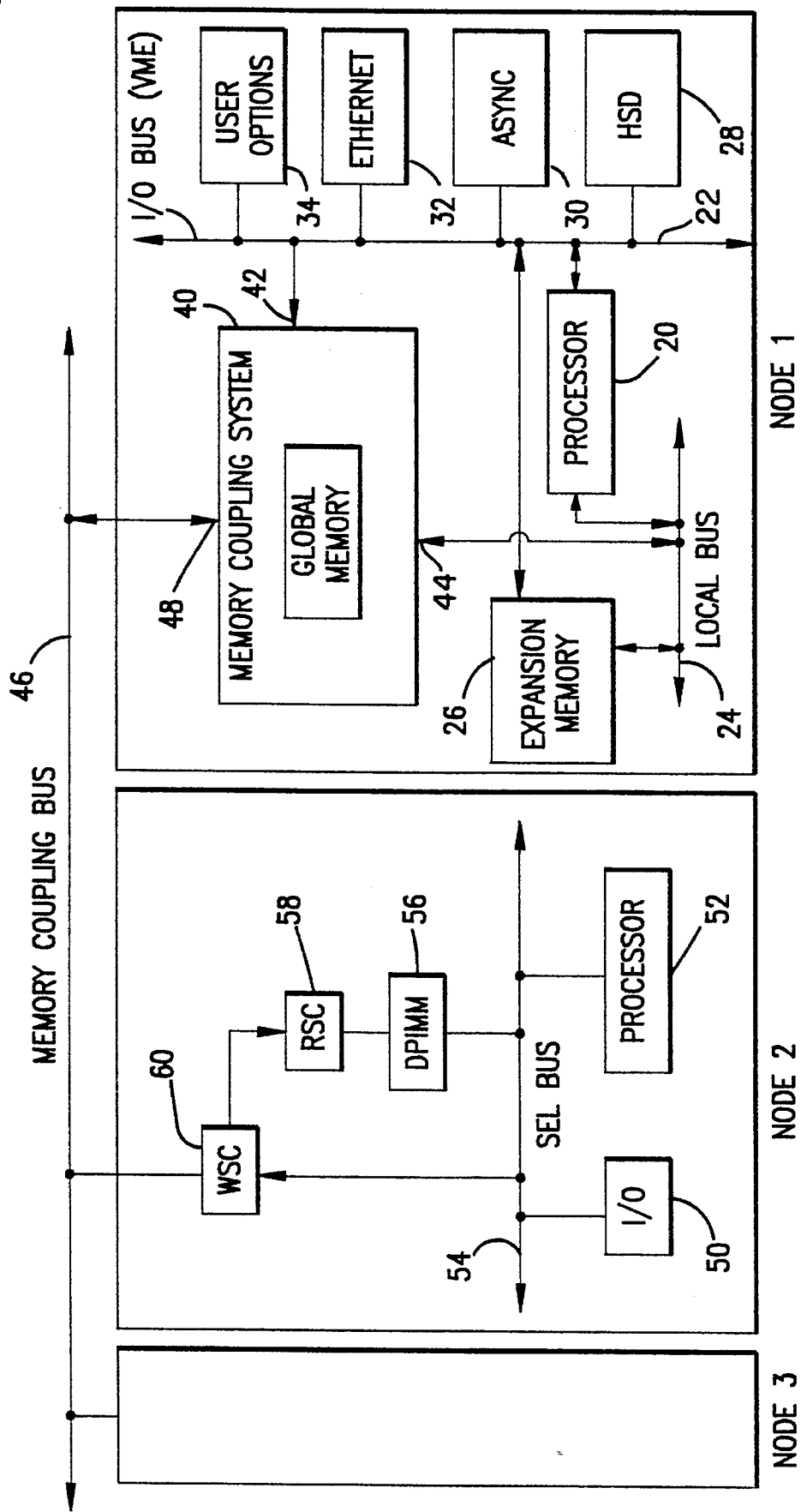
FIG. 1 is a schematic diagram illustrating a system according to the present invention.

Referring to FIG. 1, a processing system is shown that comprises a plurality of nodes, only three of which are shown. Node 1 comprises a main processor 20 interconnected by conventional interfaces with a VME bus 22 serving as an I/O bus and a local bus 24 which could be a SEL bus. Expansion memory 26 is also interconnected to buses 22 and 24. Bus 22 has coupled to it in conventional fashion a plurality of I/O devices or peripherals; shown for illustration are a high speed data interface 28, Async devices 30, an Ethernet interface 32 and other user options 34. Both buses 22 and 24 are connected to a novel memory coupling system 40 at ports 42 and 44, respectfully, which in turn is coupled to a memory coupling bus 46 at port 48. Bus 46 serves as a data line to couple directly the memories of the several nodes of the processing system to interface the multiple systems to common data, and to create a distributed high-performance uniform address space environment.

Node 2 comprises, for example, a Concept 32/67 processing unit as manufactured and sold by Encore Computer Corporation, Ft. Lauderdale, Fla. Not all of the details are shown. Node 2 includes a SEL bus 54 to which are coupled I/O 50 and a processor 52. A dual ported memory 56 has one port connected with the SEL bus 54 and its other port is connected with a read sense control 58 which, in turn, is connected to a write sense control 60 which also connects with SEL bus 54 and memory coupling bus 46. The structure and operation of Node 2 is explained in detail in U.S. Pat. No. 4,991,079 and U.S. Ser. No. 07/403,779, now abandoned filed Sep. 8, 1989, both of which are here incorporated by reference.

Node 3 can be similar to Node 2 or can be in another form, e.g., a processing unit such as a Concept 32/2000 also made and sold by Encore Computer corporation. Additional nodes as described, up to eight in number, can also be connected to memory coupling bus 46 so that the memories of the nodes are intercoupled by the bus 46 data link to substantially simultaneously update the memories without intervention of the processors (CPU) of the processing units as nodes.

In a specific example of the foregoing, Node 1 is a Model 91 of the Encore 91™ series which uses an open systems' architecture for time-critical applications. This symmetric multiprocessor system uses industry-standard hardware platforms, I/O interfaces, and OS and application software to achieve deterministic real-time capability.

The hardware architecture is based on the Motorola high-performance 88100 25 MHz 32-bit RISC processor. The single-board computer, implemented in the VME 9U form factor, includes two or four 88100 processors with supporting cache memory, 16 or 64 MB of onboard memory, two SCSI ports, an Ethernet port, four synchronous ports, a real-time clock, eight timers (seven of which are programmable), eight directly connected interrupt pairs (in and out), a high-speed Local bus and an enhanced VME bus, VME-64. This hardware architecture provides an independent memory bus from the VME-64 I/O bus, to ensure a high-performance and deterministic system response regardless of I/O load. The seven programmable timers operate at 4 MHz and are divisible by 2 to 256 to meet a wide range of timing requirements. In addition to the normal system level interrupts, eight directly connected interrupts provide fast system response to external events. Memory may be expanded to as much as 576 MB with optional external memory boards.

The operating system is Encore's real-time UNIX providing powerful industry-standard software capabilities while handling symmetric multiprocessing. For even more demanding real-time performance, the software architecture can provide guest real-time kernels that execute independently of the UNIX OS. Various implementations or compliers are available including C, FORTRAN, and Ada. Standard UNIX tools are available for software development. A full complement of CASE tools is also available including Parasight™ for nonintrusive monitoring and debugging of parallel real-time application software. The Encore 91 conforms to IEEE POSIX™ 1003.1 and the Binary Compatibility Standard (BCS) of the 88open Consortium, Ltd.

The Encore 91 incorporates as a central processor a single-board CPU comprised of two (dual) or four (quad) tightly coupled 32-bit Motorola 25 MHz 88100 RISC processors. The processor board supports a symmetric multiprocessing arrangement whereby all processors have equal access to system resources. The 88100 RISC processor provides 51 instructions, most of which execute in 1 clock cycle. The instructions that exceed 1 clock cycle, such as memory reference and floating point, execute in a pipeline fashion which allows other instructions to execute in parallel.

The CPU supports seven data types including single and double precision IEEE-754 floating point.

The Motorola 88000 Family has two 4 GB dual-mapped logical address spaces. One 4 GB area is user space and the other is operating system space. This segregates user application code from the operating system environment.

The memory resident on the processor board is 16 MB or 64 MB utilizing 1 megabit and 4 megabit DRAM technology, respectively. All processors have uniform access to memory.

Cache coherency is maintained using Motorola's 88200 cache/memory management units (CMMUs) that are tightly coupled with each processor. The CMMUs monitor the Local bus for write cycles to ensure that cache memory is updated with new information when data in the main memory is changed. A total of 128 KB cache memory is provided on the system equally shared among the processors; half is used for data, and half is used for instructions.

Expansion memory cards can be added in 16 MB, 64 MB or 256 MB increments to a maximum total capacity of 576 MB. Multiple expansion memory cards permit interboard interleaved access to memory between boards of the same capacity. The interleaving speeds up access time to memory, thereby boosting throughput of the overall system. In addition, expansion memory is dual ported to support simultaneous CPU Local bus and VME I/O accesses to main memory without contention.

Node 1 utilizes high-speed internal and external buses. The Local bus supports communication among all elements on the processor board and expansion memory at a transfer rate of 100 MB per second. This allows communication to external memory and coupling system 40 independent of VME I/O traffic, thereby increasing determinism of processor memory traffic and overall throughput of the system.

Two principal industry-standard external buses are implemented: the SCSI bus and the VME bus. Dual SCSI buses are used as peripheral buses for disks and tapes. One SCSI bus is single ended for in-cabinet peripherals; the other is a different bus for longer cabling requirements. Both buses can support asynchronous and synchronous devices. The VME-64 bus 22 allows block mode transfers at sustained speeds in excess of 55 MB per second.

HSD interface 28 is provided for high-speed data input and output. The HSD is typically used to interconnect two systems back-to-back or to act as an interface to digital instrumentation, graphical devices or customer-designed devices. The HSD provides a 32-bit wide, half-duplex, point-to-point connection. HSD can be inserted into any VME slot in the card cage; up to five may be added.

The memory coupling system interface 40 is used to create larger distributed heterogenous systems consisting of multiple Encore 90 Family and CONCEPT/32 systems. Up to eight systems can be interconnected using a single 26 MB per second memory coupling bus 46.

System 40 is triported for maximum interconnectability and high performance. One port connects to the Local bus 24, another to the VME bus 22 and the third to the Memory coupling bus 46. The system 40 card can be plugged into any available slot, although a Local bus connection provides maximum performance. The system 40 can have 4 or 16 MB storage capacity.

The processor board includes four asynchronous ports. Two are reserved for use by the operator's console and a remote diagnostic port. The principal communication connection is over the standard IEEE-802.3 Ethernet port included on the processor board. User terminals interface to Node 1 using an Encore-supplied Annex™ terminal server that resides on the Ethernet local area network. Terminal users communicate over the network using standard TCP/IP protocols and applications.

Node 1 may include industry-standard Network File System (NFS™). This allows access to files on remote systems. Node 1 can act as an NFS server (to provide files to others) or as a client (to use files that reside on other systems). NFS utilizes the standard Ethernet port.

Node 1 adopts a standardized approach to peripherals by using industry-standard 5-¼-inch form factor peripherals that mount in a SCSI chassis. These include 300 MB, 500 MB, and 1.0 GB disks, and ¼-inch cartridge tape drive. The tape drive uses the industry-defined QIC tape formats. Specifically QIC-320, -150 and -120 formats can be written and read. Tapes recorded to the older QIC-24 standard can be read. Also available is an 8 mm cartridge tape that store 2.3 GB of data. SCSI chassis-mounted peripherals can be removed from the system without dropping main processor power. In the case of disks, this feature allows removal of private data for secure storage.

As an alternative for cartridge tape storage, a standard nine-track tridensity tape transport can be used. This is a 125 ips transport with front loading access. For cabinet configurations, the tape transport may be mounted in the processor cabinet or in a peripheral cabinet. For tower configurations, a tabletop tape transport is available.

There are two choices for an operator's console. The entry level device utilizes a low functionality terminal on one of the asynchronous ports on the processor board. Control of multiple networked 91 Series systems from one device can be obtained using a personal computer style of terminal connected to the Ethernet port.

A 12-page-per-minute laser printer can be included as a peripheral.

Figure 2:
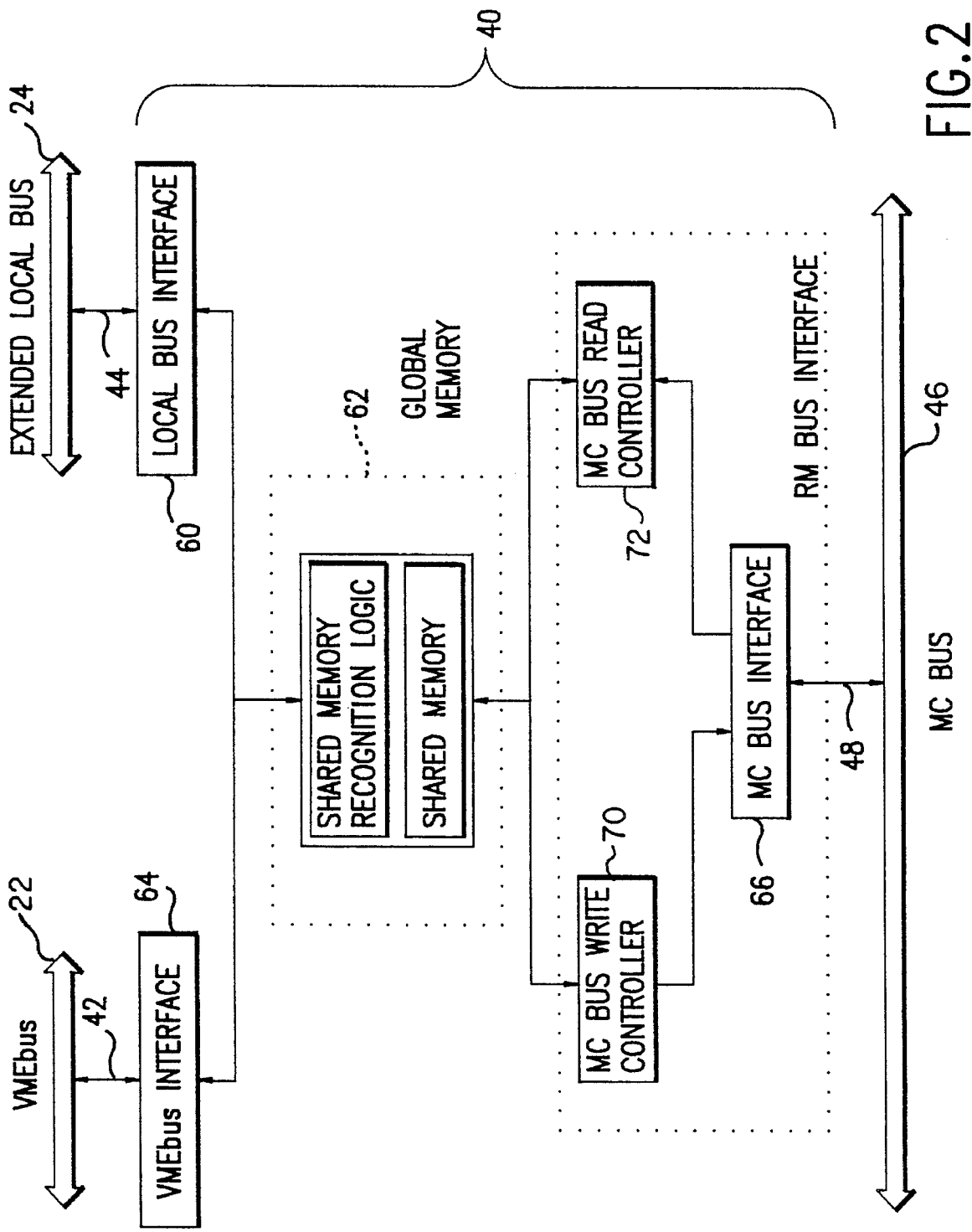
FIG. 2 is a schematic diagram illustrating bus interconnection.
Figure 3:
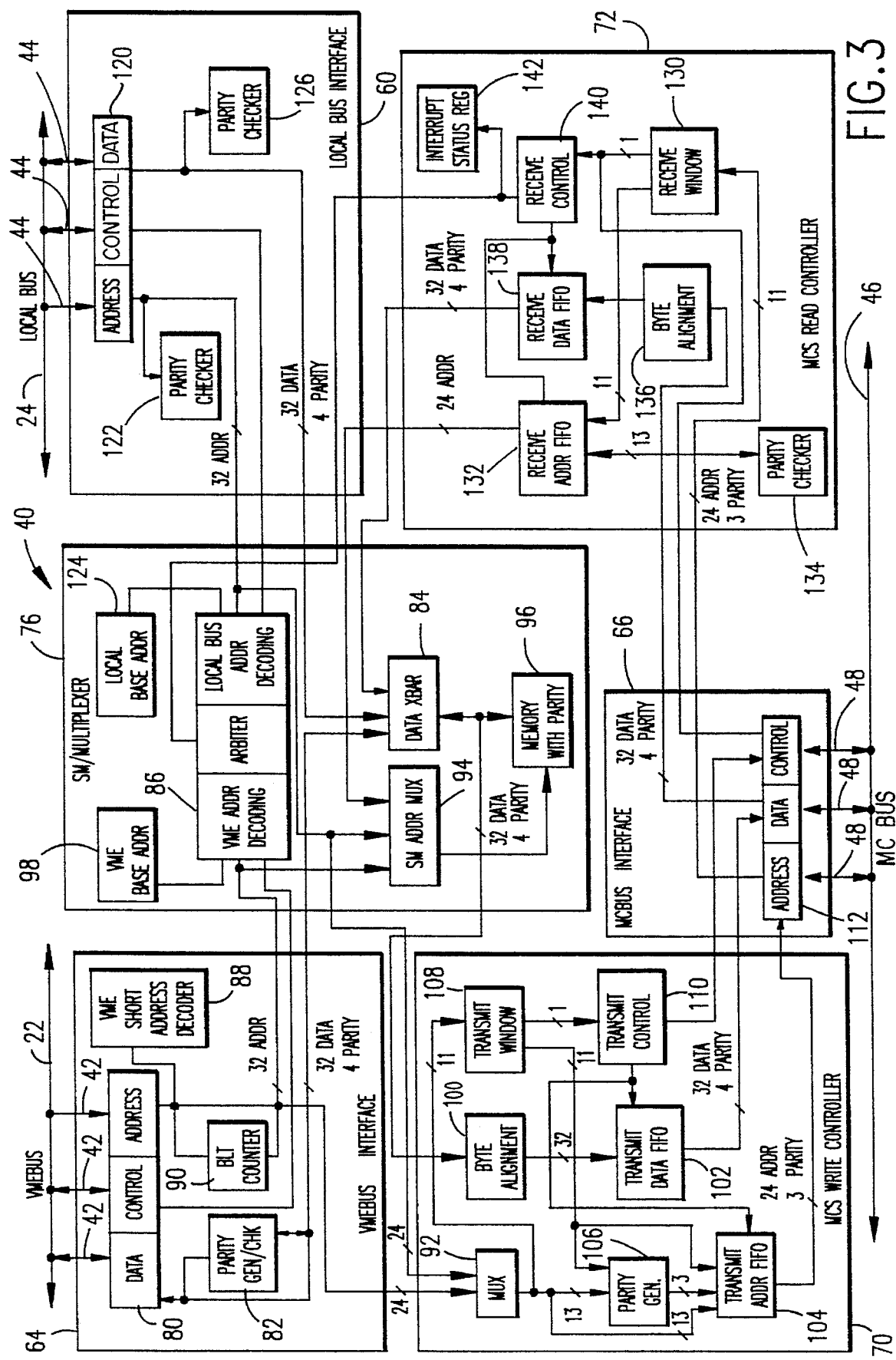
FIG. 3 is a schematic diagram showing details of interfaces and controllers used in the present invention.

Referring now more particularly to coupling system 40 and bus 46, reference is made to FIGS. 2 and 3. Memory Coupling System 40 and bus 46 architecture provides efficient coupling of multiple processor nodes for time-critical applications. This architecture allows the sharing of data among different processing nodes in a distributed computing system over a parallel, high-speed real-time linkage between the physical memories of the nodes. It also provides the full advantages of common memory, but without the nondeterministic access latencies found in most traditional multiprocessor systems with shared memory.

The Memory Coupling System 40 is incorporated onto a single board. As a specific example, the board can be a 9U form factor VME board incorporating 4 or 16 Mbytes of on-board memory. The board normally occupies a single Local Bus slot in the VME chassis. If daisy chaining is required (use of alternate daisy chain cables), a second slot (Local Bus slot or VME slot) is required for the cable adapter. The complete hardware package includes four cables for connecting the boards. The Memory Coupling bus interface is capable of supporting up to eight nodes. Shielded cables for connections between nodes, such as Encore 91 Series systems, would extend for up to 120 feet.

The MCS 40 board is tri-ported-one port each 44, 42 and 48, respectively, to the Extended Local Bus 24, the VME-64 bus 22 and the Memory Coupling bus 46. The MCS real-time link is the Memory Coupling bus 46 (MC bus). The MC bus contains 28-bit address and 32-bit data paths with data and address parity and control signals. The MCS board 40 provides the necessary logic to attach the Encore 91 Series node to the MC bus 46. The board contains either 4 or 16 Mbytes of tri-ported DRAM, which acts as global memory for all nodes in the MCS configuration. The on-board memory eliminates adding expansion memory to minimally configured systems.

The system allows up to eight nodes to maintain a local copy of a common memory area with the data in this area common to all nodes connected by the MC bus 46. Each node processor has unrestricted access to its common memory area since the copy is maintained in separate, physical memory in each node. Memory write operations to selected or predetermined memory regions or addresses are sensed by the MC bus write controller and reflected to the separate physical memories at each node over the MC bus 46.

This architecture provides a high-speed, low-latency memory interconnection between the Encore 91 Series node and other Encore 90 Family systems equipped with an MCS; Encore CONCEPT/32 systems equipped with an MCS; and Encore CONCEPT 32/2000 systems equipped with Reflective Memory System (RMS), operating in MCS mode.

FIG. 1 illustrates the memory coupling construction between three such Encore systems, namely, Node 1 is an Encore 91 Series system, Node 2 is an Encore CONCEPT/32 system and Node 3 can be an Encore CONCEPT 32/2000 system all having their ported memories connected to bus 46 via write/read sensors.

The Memory Coupling System 40 incorporates the following subsystems, see FIGS. 2 and 3.

A local bus interface 60 or local bus slave interface can allow a processor 20 on the local bus 24 to transfer data to the MC bus 46 or to access the MCS on-board global memory 62. Since the local bus 24 is parity-protected, this interface checks parity on both the address and data lines.

A VMEbus interface 64 or VME slave interface can be a 32-bit interface with extensions to provide a 64-bit-wide data path during block data transfers. This interface allows a processor on the VMEbus to transfer data to the MC bus 46 or to access the MCS on-board global memory 62. Since the VMEbus 22 does not support parity, the MCS 40 generates parity before storing the data in its on-board RAM.

A Memory Coupling bus interface 66 can perform all MC bus 46 arbitration and control. The MC arbitration logic is active only on the node selected as the arbiter node. In this case, the MCS board 40 controls the MC bus 46 arbitration for all nodes on the same MC bus. The control logic divides the MC bus time equally among requesting nodes. Assertion of a node's request line indicates that the node needs the MC bus 46. For diagnostic purposes, the MC interface 66 can provide an external loopback capability.

The MC bus interface 46 contains separate controllers for reading from and writing to the MC bus 66. The MC bus write controller 70 monitors the memory write transaction address and the transmit translation RAM (to offset the transmit address on the MC bus 46). The write controller 70 generates parity for both address and data. The MC bus read controller 72 monitors traffic on the MC bus and receives translation RAM to offset the receive address. The read controller 72 checks parity on the address but does not check data parity.

A global memory and control logic 76 including on-board global memory is available in 4- and 16-Mbytes configurations and is accessible through all three bus ports 42, 44 and 48 to the local bus 24, VMEbus 22 and MC bus 46. The control logic arbitrates the requests by each port. The control logic registers provide control and status information for the MCS board 40 and each of the bus interfaces. These registers are accessible through VME short address (A16) space.

The Local Bus interface 60 can provide the buffer between MCS global memory 62 and the Local Bus 24. The Local Bus interface 62 accepts for example, the following data type transfers: D8 (byte), D16 (word), and D32(longword). The interface also accepts memory bus (M Bus) read and write (32-bit) burst transfers. Parity is checked on both addresses and data.

The MCS 40 can provide only the VMEbus slave functionality, allowing VMEbus masters to directly access the onboard memory 62. The VMEbus slave interface 64 accepts, for example, the following data type transfers in both standard and extended modes of transfer: D08(O) (odd byte only), D08(EO):BLT (even and odd byte), D16:BLT, D32:BLT, and D64:BLT. The interface does not support read-modify-write (RMW) data transfer cycles.

The interface 64 can accept VMEbus cycles with 16-bit (short), 24-bit (standard), and 32-bit (extended) addresses. Short addresses access the control/status and configuration registers; standard and extended addresses access the MCS on-board memory 62.

In the example being described, the MCS hardware 40 can use address modifier codes to identify transfer types and address lengths. The MCS 40 recognizes for example, the following address modifier codes:

| | |
|---|---|
| Short address (A16) | 29, 2D |
| Standard address (A24) | 39, 3B, 3D, 3F |
| Extended address (A32) | 09, 0B, 0D, 0F |
| VME-64 block transfer mode (VME-64 BLT) | 19, 1B, 1D, 1F |

The MCS board, in the example, can support both VME32 and VME64 block transfer modes. Block transfer cycles are useful if a VMEbus master accesses several global memory locations in ascending order. The VMEbus master provides a single address, and then accesses data in that location and subsequent higher locations without providing any additional addresses.

The VMEbus slave interface 64 can accept for example, read/write transfers of D8 (byte), D16 (word), and D32 (longword) data types in VME32 block mode. The interface also accepts read/write transfers of 64-bit data in VME64 block mode in accordance with the Performance Technologies, Inc., Specification of VME64. If the VMEbus master crosses a 256-byte boundary for either type of transfer, the MCS board 40 generates for example, a BERR response.

Since the VMEbus has separate address and data lines, the VMEbus master can broadcast the address for the next cycle while the data transfer for the previous cycle is still in progress. This is called address pipelining. The MCS VMEbus slave interface 64 employs, for example, address pipelining in accordance with the VMEbus Specification, Revision C.1 permission 2.8.

The MCS board 40 can generate an interrupt on any one of the seven VME bus interrupt request lines. The MCS VMEbus interrupter can monitor the low-order address lines and the IACKIN/IACKOUT daisy chain to determine if its interrupt is being acknowledged. The interrupter can respond to 16-bit interrupt acknowledge cycles by providing a status/ID signal on the data lines. The mode of acknowledge that can be employed by the MCS board is release on acknowledge (ROAK)-the interrupt request line (IRQn) is released when the interrupt handler generates an interrupt acknowledge cycle.

The MC bus interface 66 can provide the buffer between MCS global memory 62 and the MC bus 46. The MC bus interface 66 can include two controllers 70 and 72 that perform read and write functions for the interface with each controller maintaining a separate FIFO buffer.

The MC write controller 70 detects global memory write transfers in the reflected memory address range, maps transmit addresses, and buffers memory coupling transfers for transmissions over the MC bus 46. The MC read controller 72 recognizes memory coupling transfers in the global memory address range, maps receive addresses, buffers received memory coupling transfers, and provides status monitoring and notifications for the MCS board 40.

The MC write controller 70 and MC read controller 72 can each consist of 2048 windows with 8-Kbyte granularity. Each window can contain a translation address to modify the upper bits of an incoming address and a single bit to indicate if a window is open or closed. The controllers can use the upper bits of a memory write or read address to determine if a transmit (write) or receive (read) window is open. If the window is open, the controller replaces the upper address bits with the translated address.

The MC read controller 72 can generate a VMEbus interrupt and light a status LED if one of these conditions occurs: a parity error on one or more of the MC bus address bytes, an MC bus address reference to a nonexistent memory location, or a write transfer creating a FIFO buffer overrun condition.

The MC write controller 70 can maintain a transmit FIFO buffer; the MC read controller 72 maintain a receive FIFO buffer. The transmit FIFO buffer can be 64 rows deep by 64 bits wide, with each row storing 32 data bits, 24 address bits, 7 parity bits, and a byte transfer bit. The receive FIFO buffer can be 64 rows deep by 72 bits wide, with each row storing 32 data bits, 28 address bits, 8 parity bits, and a byte transfer bit.

The transmit FIFO buffer can hold the data and memory addresses from the VMEbus 22 or Local Bus 24 until they can be transferred onto the MC bus 46. The MC write controller 70 can generate parity for each byte of address and data before placing it in the FIFO buffer. The FIFO buffer can prevent further writes to the reflected memory region whenever the number of FIFO buffer writes is 56 more than the number of FIFO buffer reads (an almost full condition). The FIFO buffer can prevent further writes by either not acknowledging the transfer (no DTACK signal) on the VMEbus 22 or generating a wait status on the Local Bus.

The receive FIFO buffer can hold the data and memory addresses from the MC bus 46 before they can be transferred into the global memory. Each address and data byte on the MC bus 46 can have a parity bit. The MC read controller 72 can check the address parity before placing the address in the FIFO buffer and store the data in the FIFO buffer without checking its parity bit. If the MC read controller 72 detects an address parity error, it can inhibit the transfer of both the address and data to the FIFO buffer. The FIFO buffer can prevent further MC bus writes to the memory coupling region whenever the number of FIFO buffer writes is 56 more than the number of FIFO Buffer reads. The FIFO buffer can prevent further transfers on the MC bus 46 by driving the MC bus busy signal, thus preventing a FIFO buffer overflow.

The MCS board 40 can contain 4 Mbytes or 16 Mbytes of parity-protected global memory with separate ports to the Local Bus, VMEbus and MC bus. This memory may be divided into three regions: private memory, transmit reflected memory, and receive reflected memory. Data written to the transmit reflected memory region can be or is reflected on the MC bus 46 thus forming a single common memory space for all processors on the MC bus 46 (though it remains a separate physical memory). Any data received by the MC port 42 is stored in the receive reflected memory region. The global memory base addresses for the Local Bus and VME bus address spaces can be software-programmable; the global memory base address of MC bus address space is preferably always 0.

For example, the 4-Mbyte MCS board 40 can use 1-Mbit 80-nanosecond DRAMs arranged as 256K×4; the 16-Mbyte MCS board 40 can use 4-Mbit, 80-nanosecond DRAMs arranged as 1M×4. The DRAM is divided into two banks with each 2-Mbyte bank providing a 64-bit-wide data path. This allows the storage of 64-bit data in one cycle during the VME64 block transfer mode. Each bank also has 8 bits of parity information, one of each byte, stored separately in a 1M×1 DRAM. Using page mode DRAMs reduces the read and write cycle times for the second through nth accesses during VMEbus block transfer and Local Bus burst transfer modes.

The MCS board 40 can use a prioritized arbitration scheme to resolve simultaneous read/write accesses of memory. During a burst transfer, only the port performing the transfer is allowed to access the global memory-the MCS board 40 does not grant access to either of the other two ports.

Referring now to FIT. 3 in detail, VMEbus 22 is connected via port 42 with VMEbus interface 64. Data, control and address transceivers including registers 80 monitor bus 22. Parity generator and check 82 is connected to the data portion of registers 80, the data output of which is connected to Data XBAR 84 in the shared memory/multiplexer 76. The control section or registers 80 is connected to the VME address decoding and arbiter 86. The address section of registers 80 is connected in common to VME short address decoder 88 and BLT counter 90 and also in common to MUX 92 in MCS write controller 70 and VME address decoding 86 and to shared memory address MUX 94, the output of which is connected to the Memory 96. Data XBAR 84 also is connected with Memory 96. VME base address 98 is connected to VME address decoding 86 to provide address range control.

Memory 96 is connected to Byte Alignment 100 in controller 70 which in turn is connected to Transmit Data FIFO 102. MUX 92 connects with Transmit Address FIFO 104 via parity generator 106 and Transmit Window 108 is connected with MUX 92 and in turn connects with Transmit control 110, parity generator 106 and Transmit Address FIFO 104. Control 110 is also connected to FIFO 104. FIFOs 102 and 104 and control 110 are connected, respectively with the appropriate sections of output registers 112 in the MC bus interface 66 and output via port 48 to MC bus 46.

Local bus 24 is connected via port 44 with registers 120, having address, control and data sections, in interface 60. The address section is connected to Parity checker 122 and the local bus address decoding section of Arbiter 86. The control section is also connected to Arbiter 86 to which is also connected local bus address 124, to provide address range control. The data section of registers 120 is connected to Data XBar 84 via Parity checker 126. Shared memory address MUX 94 is connected in common with the address section of registers 120 and the local bus address decoding of Arbiter 86.

Read controller 72 takes as its input the output of MC bus 46 monitoring registers 112. The address section of registers 112 are connected in common to Receive Window 130, Receive address FIFO 132 and Parity checker 134. The data section of registers 112 are connected to Byte Alignment 136 which in turn connects with Receive Data FIFO 138. Receive Window 130 connects with Receive Control 140 which connects with Interrupt Status Reg. 142 and Arbiter 86. The control section of registers 112 connects with Receive Control 140. Receive window 130 connects with Receive address FIFO 132. The operation of the apparatus has been described above.

From the above it will be evident that I/O can feed via the VMEbus 22 and port 42 directly to the memory on the Memory Coupling system board 40 and then out via port 48 onto the Memory Coupling bus 46 to any node coupled to bus 46. This allows data, e.g. a data base on disc or network or other communication devices, to be reflected into a preselected memory in any node. The VMEbus 22, as explained, is formatted by address (memory mapped) and therefore, I/O input on Node 1 can be addressed to either processor 20 or Memory Coupling System 40. Since each system 40 can have its global memory or receive window 130 (see FIG. 3) initialized with an address range which can be set by processor 20, I/O input can be directed to any node X. Port 44 is used to input and output data from system 40.

Figure 4:
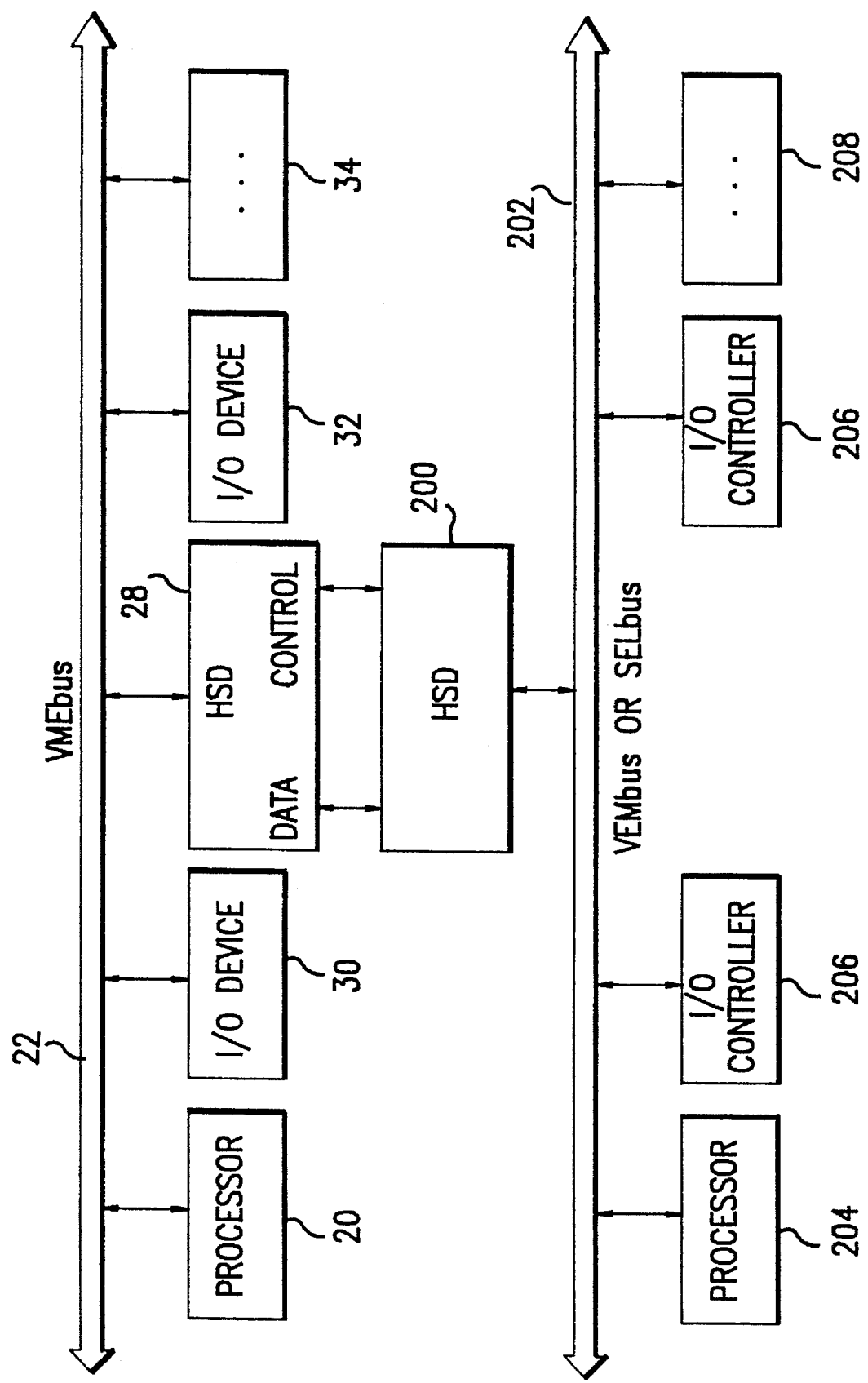
FIG. 4 is a schematic diagram showing details of the high speed data interface.

Referring now to FIG. 4, a known high speed data interface 28 is coupled on VMEbus 22 as described. Data on VMEbus 22 is passed via HSD 28 to a similar HSD 200 coupled on another VMEbus or SEL bus 202 to transfer data from one system, as portrayed in FIG. 1 to another such system. Coupled to bus 202 are a processor 204, I/O controllers 206 and other peripheral devices, representatively indicated by block 208.

HSD 28 can be a 32-bit parallel High-Speed Data interface (HSD) and acts as a VME-based high-performance DMA interface. The HSD 28 connects two systems back-to-back or acts as an interface to digital instrumentation, graphical devices, or I/O front-end devices. The HSD 28 can provide a 32-bit-wide, half-duplex, point-to-point connection.

A typical complete HSD 28 package can include a 6U form factor VME board on a 9U VME adapter card and the appropriate software drivers. The HSD board would occupy a single Local Bus or VME-only slot in the VME card cage. The HSD can use two 50-pin connectors, one each for data and control signals, with the cables exiting from the front of the board. The HSD hardware adheres to the VME Specification Rev. C. Extender cables, available in lengths of 50 and 100 feet, can be used if desired.

The HSD 28 can provide External Function (EF) and Inter Bus Link (IBL) modes of operation with software controlling the switching of modes. Typical IBL connections would include two or more Encore 91 Series or CONCEPT/32 systems (see FIG. 4). A single Encore 91 Series system can concurrently support up to five HSD devices using available slots in the VME card cage.

For VMEbus-to-VMEbus links, a processor must support 32-bit transfers into short I/O address space. While the Encore 91 Series MC88100 processors support this requirement, some processors may not.

Figure 5:
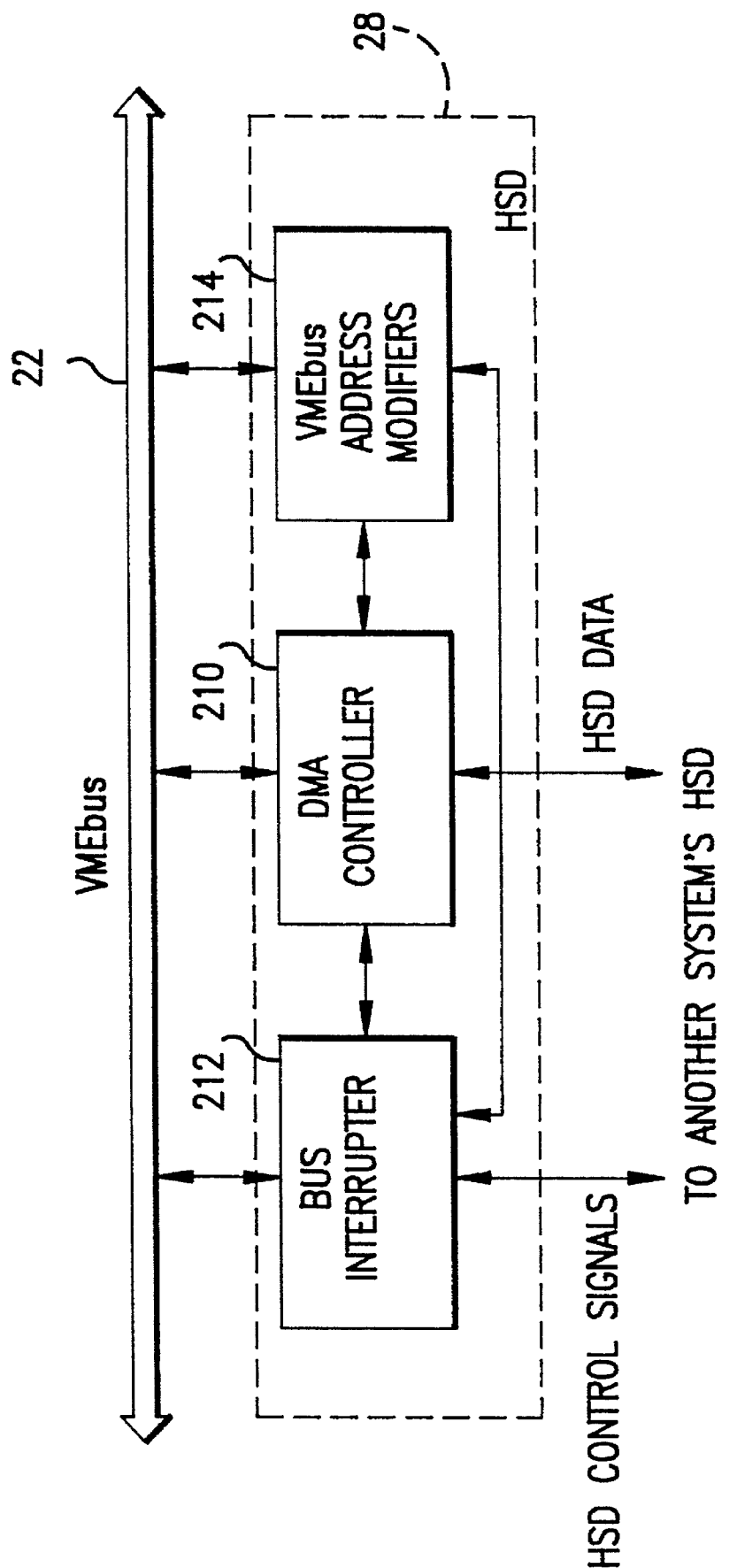
FIG. 5 is a detail block diagram of the HSDI.

Referring to FIG. 5, the HSD 28 incorporates a DMA controller 210, a bus interrupter 212, and a VME bus address modifiers 214, each of which is programmable. The HSD 28 uses the VME short I/O address space for on-board register addressing.

The output of the bus interrupter 212 provides the usual HSD control signals and interrupter 212 is coupled to the address modifiers 214 and Controller 210. The HSD data is output from Controller 210 with address modification as required to be compatible with the other system's HSD.

The HSDI is memory mapped, that is, address mapped and not I/O mapped. It requires specific address commands from the processor to operate or to set a range of addresses comparator. The HSDI operates in different modes; it constitutes a 32-bit interface that passes data plus address or just data passing or taken off in parallel. It operates in different modes as set by the processor.

The following is a further elaboration of the system of the present invention with special emphasis on the functional aspects. As mentioned, board 40 contains four megabytes expandable to 16 MB of parity protected global memory. This global memory has three ports: local bus port 44, VMEbus port 42 and MC Bus port 48. This allows all of the processors direct access to global memory. The base address of global memory on local and VMEbus address space is programmable via software. The base address of memory on MC Bus address space is always zero. The memory may be divided into three regions, private memory, transmit reflected memory and receive reflected memory. Data written to transmit reflected memory region is reflected on MC bus, thus forming one common memory space to all the CPU's even though it is actually a separate physical memory. Any data received by the MC port is stored into receive reflected memory region.

The board 40 can use one megabit (256K×4) 80 ns dynamic RAM to implement 4 MBytes of global memory. The board 40 design can allow the global memory to be expanded to 16 MBytes by using 1M×4 DRAMs. The DRAM is divided into two banks, each bank consisting of 2 Mbytes of memory. Each bank has 64-bits wide data path.

Figure 6:
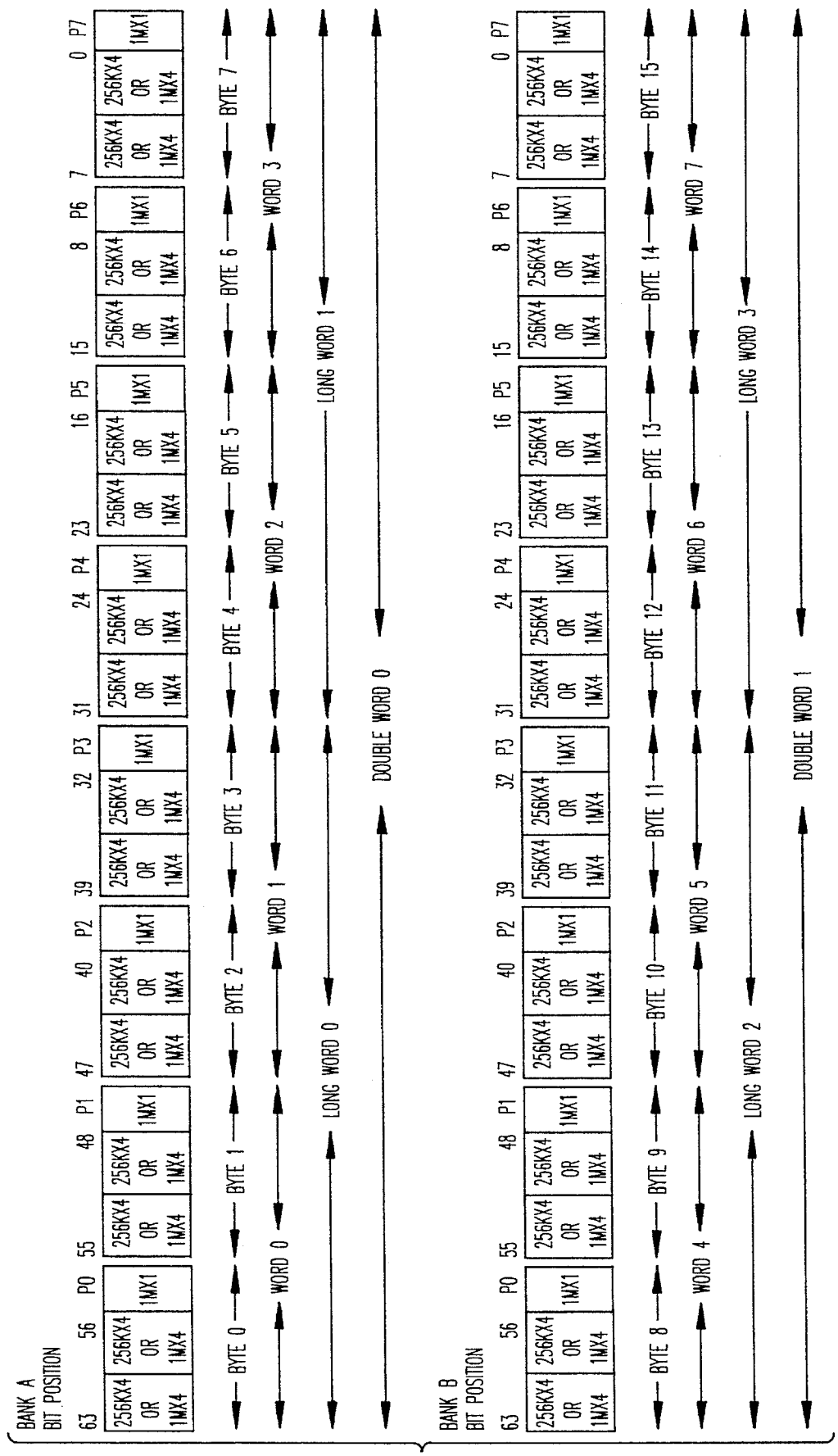
FIG. 6 is a diagram of global memory organization.

This allows the 64 bits of data to be stored into the memory in one cycle during VME64 block transfer mode. Each bank also has 8 bits of parity information, one for each byte. The parity bit is stored separately on 1M×1 DRAM. Memory organization is shown in FIG. 6.

By using page mode DRAMs, the read and write cycle times for the second through nth are reduced during VMEbus block transfer and Local bus burst transfer mode.

Since global memory is tri-ported, the system 40 can use a prioritized arbitration scheme to resolve the simultaneous read/write access of the memory. In the selected priority scheme the VME bus 22 would be assigned the lowest priority. The local and MC bus priority are dynamic. The local bus 24 would have the higher priority than MC bus 46 for as long as the MC bus receive FIFO's are less than half full, but whenever the MC bus receive FIFO's are half or more than half full the MC bus would have higher priority than the local bus.

During burst transfer the global memory accesses are not granted to the other two ports until the burst transfer requirement of the port currently accessing global memory is satisfied.

MC write controller 70 functions include:
  Detection of global memory write transfers in the reflected memory address range;
  Mapping of transmit address;
  Buffering of reflected memory transfer for transmission over the MC bus 46.

The transmit buffering FIFO 102, 104 provides buffering of data and memory address from the VMEbus 22 or Local bus 24 until it can be transferred onto MC Bus 46. The FIFO is 64 deep by 64 bits wide to allow for 32 data bits, 24 address bits, 7 parity bits and a byte transfer bit. Parity is transferred for each bytes of address and data on MC Bus 46. The parity is generated before the data and address are clocked into the FIFO.

When FIFO writes outnumber FIFO read by fifty six, the FIFO 102, 104 generates an almost full condition. The local bus 24 and VME bus 22 are prevented from further writes to reflected memory region. On the VMEbus 22 the write is prevented by not acknowledging the transfer (no DTACK signal), and on the local bus, the writes are prevented by generating the wait status.

The MC Bus write controller 70 consists of 2K of transmit window. Each window has a translation address to modify the upper 11 bits of address and 1 bit to indicate if the window is open or closed. The upper 11 bits of memory write address are used to determine if a transmit window at the address is open. If the window is open the upper 11 address bits are replaced by the 11 bits of translated address in MC I mode or 15 bits in II mode. Programming of the transmit window will be described in conjunction with the system registers.

MC read controller 72 functions include:
  Recognition of reflected memory transfers to global memory address range;
  Mapping of receive address;
  Buffering of received reflected memory transfer;
  Status monitoring and notification.

The receive buffering FIFO 132, 138 provides buffering of data and memory address from the MC Bus 46. The FIFO is 64 deep by 72 bits wide to allow for 32 data bits, 28 address bits, 8 parity bits and a byte transfer bit. Each address and data byte on MC Bus has a parity bit. The parity is checked before the address is clocked into the FIFO. A parity error detected on any address byte will inhibit the address and data transfer to FIFO. Data is stored into the FIFO without checking the data parity.

When FIFO writes outnumber FIFO reads by fifty six the FIFO generates almost full condition. This condition causes the MC Bus busy signal to be driven on the MC Bus. The MC Bus busy will stop further transfer on the bus to prevent a FIFO overflow from occurring.

The MC Bus read controller 72 consists of 32K of receive window. In MC I mode only the first 2K window are used. Each window has a translation address to modify the upper 11(15) bits of address and 1 bit to indicate if the window is open or closed. The upper 11(15) bits of MC Bus transfer are used to determine if a receive window at the address is open. If the window is open the upper 11(15) address bits are replaced by the 11(15) bits of translated address. Programming of the receive window will be described in conjunction with the system registers.

Three error conditions will cause the MC read controller 72 to generate a VMEbus interrupt and light a red status LED. The conditions are:

1. MC Bus Parity Error—A parity error was detected on one or more of the address byte on the MC Bus.

2. Non Present Memory Error—An address from the MC bus referenced a non-existent memory location.

3. Overrun Error—A condition created by the 65th write transfer into the receive FIFO.

There are two other conditions that will also generate a VMEbus interrupt and light yellow status LED. The conditions are:

1. Node Busy—This bit indicates that the node receive FIFO is almost full (has 56 entries). Once a node is busy, it will drive Global busy on the bus.

2. Global Busy—This bit indicates that the receive FIFO of a node on the MC bus is almost full, and a node can not receive any more data on the MC bus.

The MC Bus arbitration logic (for MC I mode only) is active on the board 40 when it is a master node on the MC bus. In this case, it becomes the MCS 40 that controls the MC Bus arbitration for all nodes on the same RM Bus.

The central element in the MC Bus arbitration logic is the bus grant state machine. MC bus 46 request lines from all the nodes are captured from the bus. These request lines are applied to address lines of a PROM which contains the state machine program. Depending on the condition of the request lines, the state machine moves from state to state, toggling the MC bus grant lines and again testing the condition of the request lines.

Figure 7:
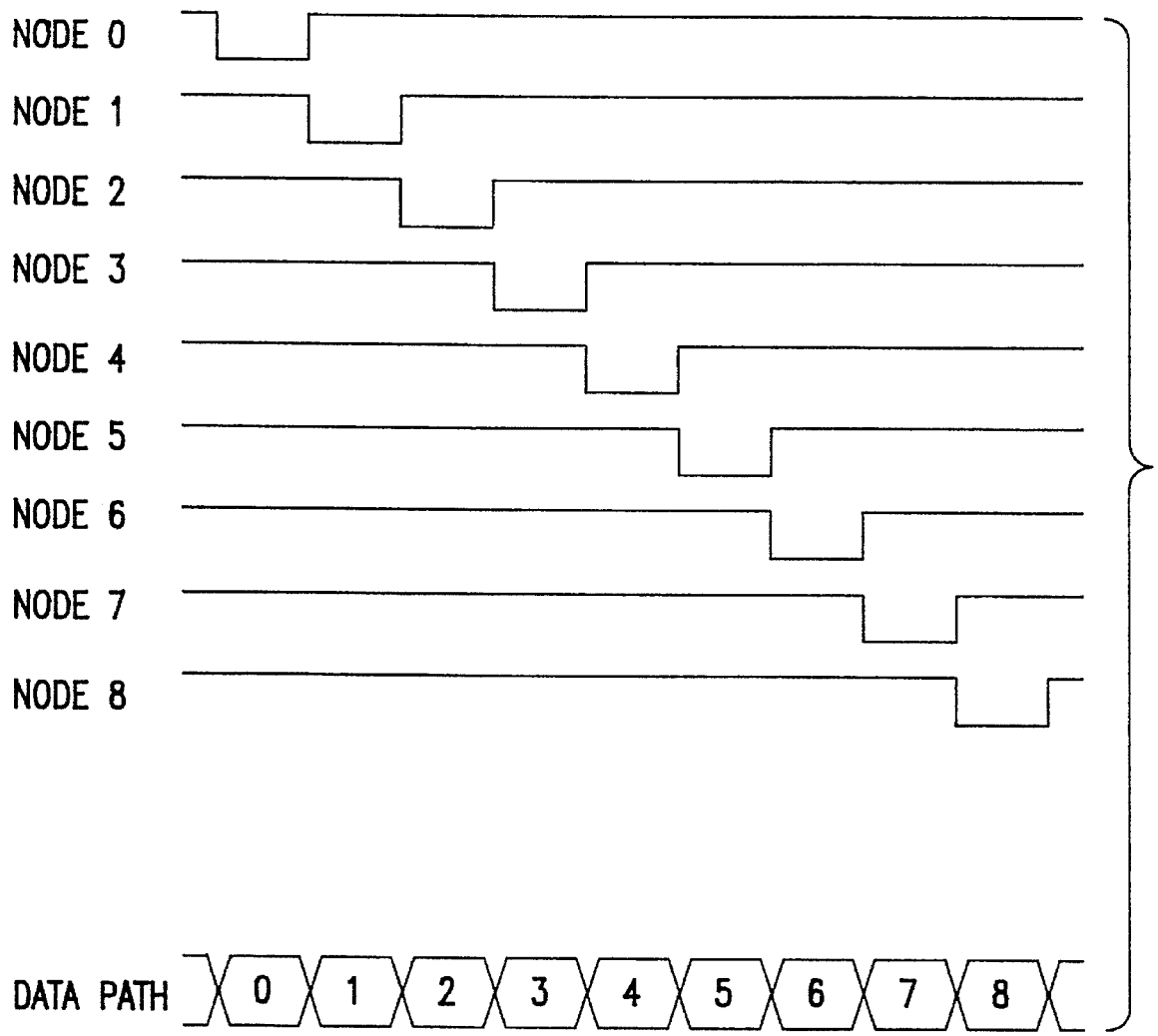
FIG. 7 is a time chart of memory coupling bus grants, all nodes requesting.
Figure 8:
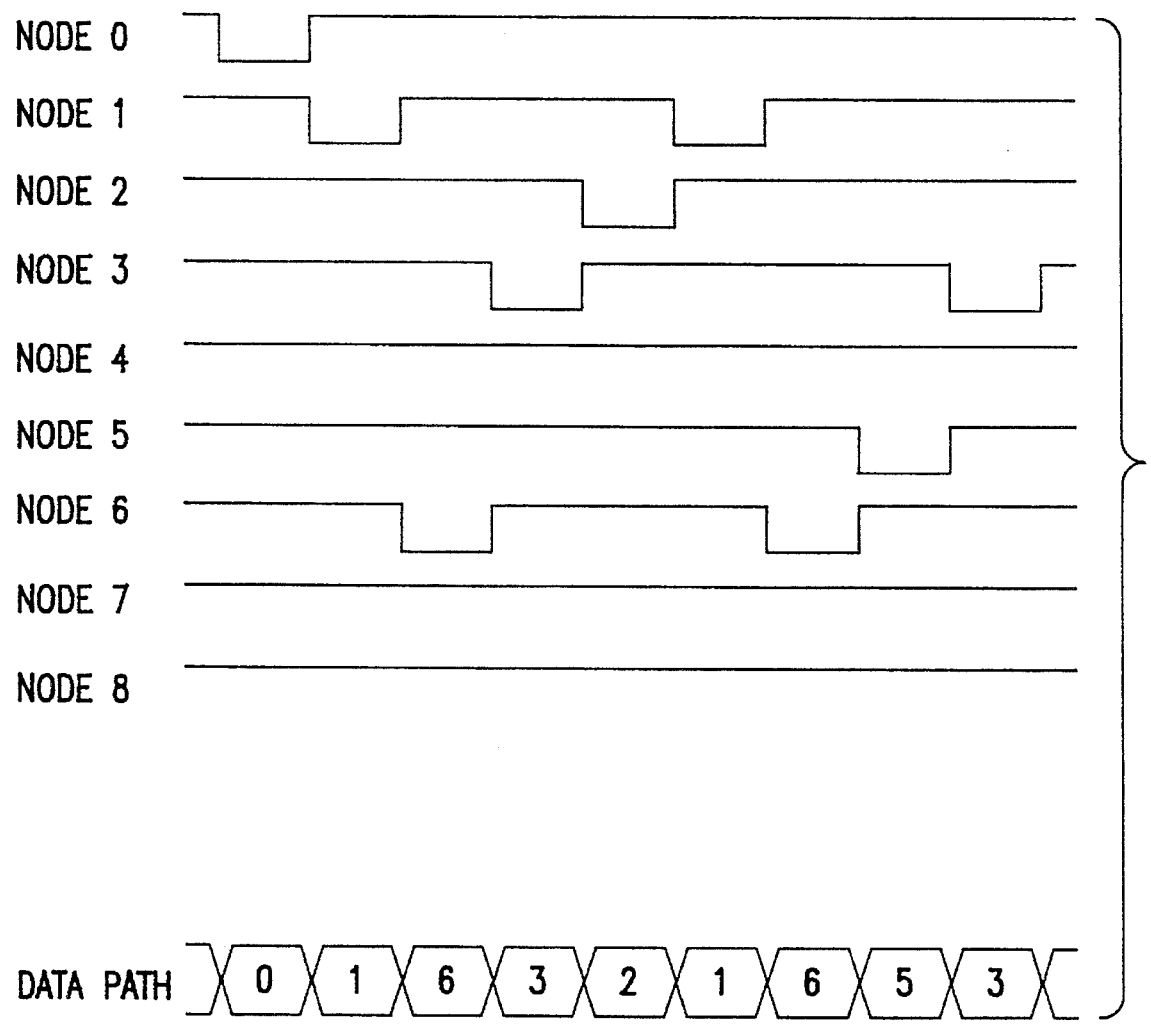
FIG. 8 is a time chart of MC bus grants, random requests.
Figure 9:
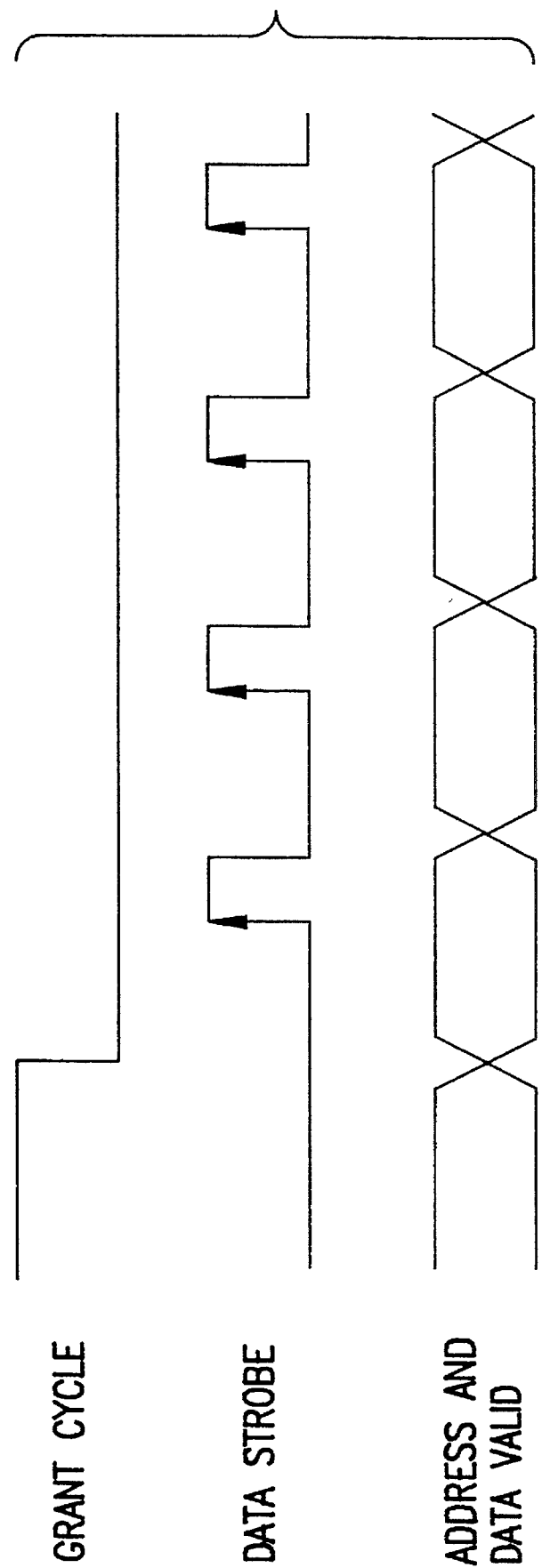
FIG. 9 is a time chart of MC bus continuous node request sequencing.

The bus grant scheme divides the time equally among requesting nodes. If all nodes in a fully configured MC system request the MC bus, the MC Bus state machine sequences the MC Bus grant to give each node a time slice of the MC Bus. This condition is shown in FIG. 7. FIG. 8 shows the bus grants issued where seven nodes are randomly requesting the bus, and FIG. 9 shows continuous bus grant cycle if only one node is continuously requesting the use of the MC Bus 46.

Write operations to on board memory 96 in the reflected memory range are received by the memory on the MC port 48. Reflected memory transfers are not sensed on the local or VMEbus of the receiving node and, thus, a cache system can not track the changes that occur in the reflected memory range. For this reason, the reflected memory address range must be configured within the uncached segments of a node's memory range.

In the processor 20, included cache memory can be disabled with segment (4M-Byte), page (4K-Byte) and block (512K-Byte) granularity on physical address boundaries. Note that the minimum size of reflective window is 8K bytes or 2 page frames.

The system 40 proves a means for software to initiate an interrupt to any or all nodes on the MC Bus network. The system 40 can use one of seven VMEbus interrupts or an external interrupt provided on the CPU. The system 40 hardware can provide eight mailbox bits as part of status. These eight bits will indicate to the receiving node which word of an eight word file the mail box word was stored in.

The system 40 or other similar hardware of each node has a mailbox address register. The register is loaded with an address value by software. The register value selects an eight word (file) area of memory space and it is compared to the address of transfers on the MC bus. (The comparison occurs before address translation and also the window for the address must be open for the compare to occur.) When a match occurs, the interrupt selected by the word address of the bus transfer is generated after the word is stored in the global memory. A second file address space will also generate a compare, namely, the last eight word file in the mapblock selected by the value in the mailbox register. This feature allows for all nodes on the network to be interrupted by one transfer from a sending node.

The system 40 mailbox feature allows a node equipped with the system 40 hardware to generate an interrupt on a node on the same MC bus or a node connected via a repeater as shown in U.S. Pat. No. 4,991,079 which is here incorporated by reference. The other destination node must be equipped with system 40 hardware and properly configured with a file bounded mailbox area within a memory coupling (MC) receive window.

To use the mailbox feature of the system 40 hardware, it is necessary to define a file-bounded area within a memory coupling area. If the node will receive interrupt only, the mailbox area must be within an open MC receive window. If the node will only generate interrupt to destination nodes, the mailbox area must be in an open MC transmit window. To both transmit and receive interrupt request, the mailbox area must be contained in an open, overlapping, MC transmit and receive window.

To generate an interrupt on a node, a word is written to the reflected region that corresponds to the destination nodes mailbox area.

In order to recognize an interrupt activation request, the address of the word is broken into three specific areas. (NOTE: The value of the word itself is unimportant, and may be user defined). Bits E–H and 0–18 of MC bus 46 must match the value contained in the mailbox register of the destinations nodes. Bits 19–21 define the interrupt level, and bits 22–23 should be reset. Because the system 40 hardware compares the address before translation, the value used to define the mailbox address must be the address transmitted onto the MC bus 46. Bits 19–21 of the MC bus address are not compared to the address contained in the mailbox register. These bits are used to generate one of eight status bits.

The system 40 card interface to the Memory Coupling or Reflected Memory Bus 46 can be provided by four 60-pins connectors which can be located on the front edge of the card. The reflected memory bus 46 is a bidirectional, differential data path consisting of data, address, parity, request, grant, port I.D. and control signals. Each of these signals are carried by twisted wire pair between the nodes. The following table 1 provides all the signal names and their functional description.

TABLE 1

| Signal Names | Description |
|---|---|
| RMDBUS<31..0> | RM bus bidirectional data bus |
| RMABUS<23..0> | RM bus bidirectional address bus |
| RMTF | RM buy byte transfer tag |
| RMDPAR<3..0> | RM bus data parity |
| RMAPAR<2..0> | RM bus address parity |
| RMBREQ<8..0> | RM bus node request |
| RMBGRNT<8..0> | RM bus node grant |
| RMNDID<3..0> | RM bus node I.D. |
| RMDVALIDEN | RM bus data valid enable |
| RMDVALID | RM bus data valid |
| RMGBSY | RM bus global busy |

The following provides the function and format of each of the registers on the system 40 board. Most of the registers are programmable. Programming is done by writing to the selected location in VME short address (A16) space. The base address in VME short address space is assigned via configuration jumpers located on the board. Five jumpers are used to assign a base address.

FIGS. 10 and 11 show the map of control and status register located on system 40 board. Each register has access rights, some registers are read only, and some are read and write. If an access right is violated the system 40 board will not recognize the address and generate the acknowledge cycle. The physical address of the control and status register is used as an index into the base address for addressing the desired register.

The following describes the control and status registers and the unique function they provide.

The shared memory base address on local bus 24 has the physical address: 0x0040; the access right: read/write; and the transfer type: word. By definition, the content of this register specifies the base address of the on board memory in local bus address space. This base address is the starting address of the on board memory 96. The local bus address bits 22 thru 31 are compared with the content of the base address register. When the equality is met, the on board memory is selected.

The local base register value can be calculated by right shifting the local address by 22 as shown below.

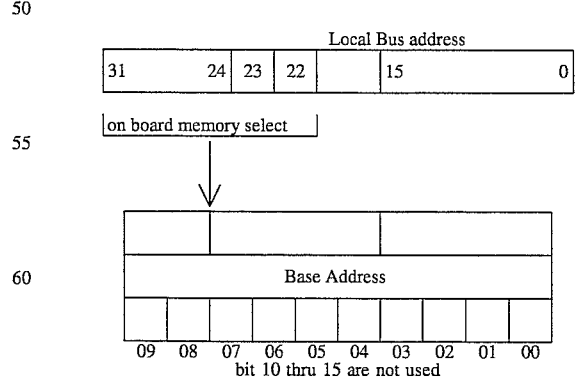

The Memory Coupling system 40 (4MBytes) on board 4 MBytes memory could reside in any multiple of 4 MB local bus boundary, (i.e. 0 MB, 4 MB, 8 MB, 12 MB, . . . so on).

The Memory Coupling System 40 (16 Bytes) On board 16 Mbytes memory could reside in any multiple of 16MB local bus boundary, (i.e. 0 MB, 16MB, 32MB, 48 MB, ... so on).

The shared memory base address on VME bus 22 has the physical address: 0x0042; the access right: read/write; and the transfer type: word. By definition the content of this register specifies the base address of the on board memory in VME bus address space. This base address is the starting address of the on board memory. The VME bus address bits 22 thru 31 are compared with the content of the base address register. When the equality is met, the on board memory is selected.

The VME base register value can be calculated by right shifting the local address by 22 as shown below.

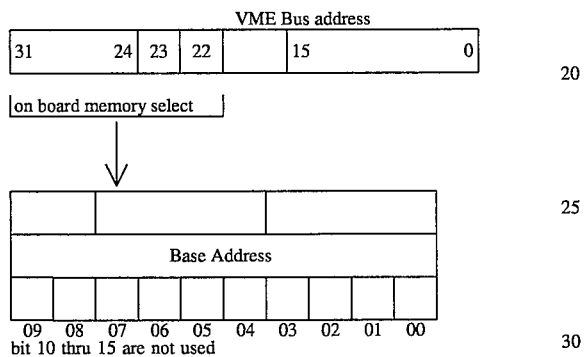

The Memory Coupling System 40 (4 MBytes) on board 4 MBytes memory could reside in any multiple of 4MB VME bus boundary, (i.e. 0 MB, 4 MB, 8 MB, 12 MB, ... so on).

The Memory Coupling System 40 (16 MBytes) On board 16 Mbytes memory could reside in any multiple of 16 MB VME bus boundary, (i.e. 0 MB, 16 MB, 32 MB, 48 MB, ... so on).

The VMEbus interrupt control register has the physical address: 0x0044; the access right: read/write; and the transfer type: word. By definition the bits 0 thru 2 of the VMEbus interrupt control register contains the encoded value of VMEbus interrupt request level. Writing a zero to this location disables the board from generating interrupt. See diagram and table below.

The MCS transmit windows ram address register has the physical address: 0x0046; the access right: read/write; and the transfer type: word. By definition, the content of this register contains the pointer to the transmit windows RAM. Upon writing to the transmit window data register, the content of this register is incremented by one, this allows the software to write into sequential transmit window RAM location without needing to rewrite to this register. See format diagram below.

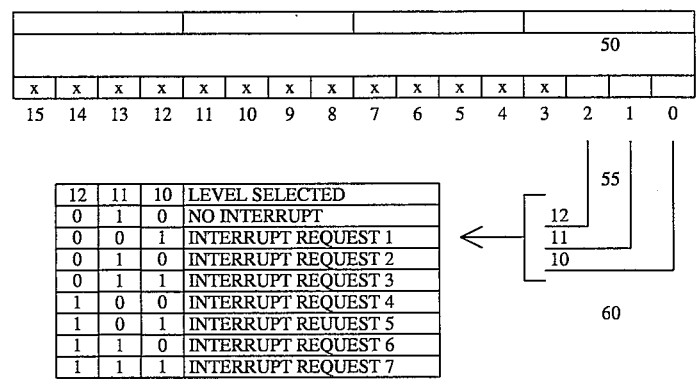

| | | | | | Window Address | | | | | | | | | | |
|---|---|---|---|---|---|---|---|---|---|---|---|---|---|---|---|
| 0 | 0 | 0 | 0 | 0 | | | | | | | | | | | |
| 15 | 14 | 13 | 12 | 11 | 10 | 09 | 08 | 07 | 06 | 05 | 04 | 03 | 02 | 01 | 00 |

The MCS transmit windows ram data register has the physical address: 0x0048; the access right: read/write; and the transfer type: word. By definition, this register contains two parameters. The most significant bit indicates whether the window is to be opened or closed. If set, the window is closed, otherwise the window is open. If the window is to be opened the least significant bits specifies the translation address to be placed in to the transmit window RAM located specified by the transmit window address register. See format diagram below.

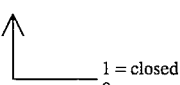

The MCS receive windows ram address register has the physical address: 0x004A; the access right: read/write; and the transfer type: word. By definition the content of this register specifies the start of the physical address of the receive windows. Upon writing to the receive window data register, this register is incremented by one. See format diagram below.

| | | | | | Window Address | | | | | | | | | | |
|---|---|---|---|---|---|---|---|---|---|---|---|---|---|---|---|
| 0 | | | | | | | | | | | | | | | |
| 15 | 14 | 13 | 12 | 11 | 10 | 09 | 08 | 07 | 06 | 05 | 04 | 03 | 02 | 01 | 00 |

The MCS receive windows ram data register has the physical address: 0x004C; the access right: read/write; and the transfer type: word. By definition, this register contains two parameters. The most significant bit indicates whether specified by the receive window address register. See format diagram below.

the window is to be opened or closed. If set, the window is closed, otherwise the window is open. If the window is to be opened, the least significant bits, specify the translation address to be placed in to the receive window RAM location

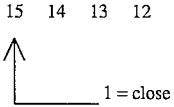

The MCS control registers have the physical address: 0x004E (reg0); and the physical address: 0x0050 (reg1); the access right: read/write; and the transfer type: word. See format diagram below.

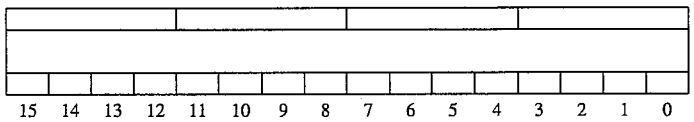

The bit definitions for the above are as follows. For the MCS control registers 0 bit definition:

Bit 0 Reserved.
Bit 1. Online bit (Control).
  a. reset (Offline)—With this bit in the reset state the system 40 hardware will not drive or receive any data from the MC bus 46.
  b. set (Online)—Normal operation.
Bit 2. Reserved.
Bit 3. Enable MC bus port 48.
  a. reset—Will not sense on board memory write transactions and transmit to MC bus 46.
  Control information will be accepted to be written into the Control/Status register.
  b. set—Normal operation.
Bit 4. Enable Local bus port 44.
  reset—Will ignore the data transfer from the local bus.
  set—Normal operation.
Bit 5. External Diagnostic loopback bit.
  a. reset—Normal operation.
  b. set—Bus loopback mode enabled—data is transferred from the Transmit FIFO to the Receive FIFO by way of the MC Bus. Normal address translation will occur. The Receive window must be enabled for the transmitted address in order for the data to be accepted. Also the address will be translated by the amount set up in the Receive Window Ram. The following sequence to set the external diagnostic loopback bit must be followed.
    1. Set the offline bit in the Control register.
    2. Execute a Software Clear.
    3. Set the external diagnostic loopback bit of the Control register.
    4. Clear the offline bit in the Control register.
Bit 6. Software clear bit-(control).
  a. reset—Software clear disabled.
  b. set—Software clear invoked. Error status and FIFOs will be cleared. However, system 40 offline, control register and soft loadable configuration registers will not be cleared.
Bit 7 & 8. Encoded force error bits.
  Causes an VMEbus interrupt and the appropriate bit to be set in the status register.

|    | bit 7 | bit 8 |                                      |
|----|-------|-------|--------------------------------------|
| a. | 0     | 0     | no forced errors - normal operation  |
| b. | 0     | 1     | force parity error                   |
| c. | 1     | 0     | force non present memory             |
| d. | 1     | 1     | force overrun error                  |

Forced errors can be cleared from the Status register by reading the status register, as long as the forced condition no longer applies.

Bit 9. Force system 40 Busy bit
  a. reset—Normal operation.
  b. set—Inhibit the Receive FIFO from outputting data to the on board memory. Hence, the FIFO can be filled and cause the Global Busy signal to be driven on the MC Bus.
Bit 10. Output FIFO disable bit.
  a. reset—Normal operation.
  b. set—Don't allow output FIFO to send data to the MC bus. This bit is used by diagnostics to hold up transfers and then to release them so as to create a burst of activity on the MC bus.
Bit 11. Force a parity error on the MC bus.
  a. reset—Normal operation.
  b. set—Forces incorrect parity for output transfers to the MC bus. This should cause a parity error on all receive nodes.
Bit 12. Force receive FIFO overrun.
  a. reset—Normal operation.
  b. Set—Inhibit driving the Global Busy signal and therefore allow the receive FIFO to be overrun and create an overrun error. This must be used with force MCS busy to effectively cause the overrun.
Bit 13. Enable VME standard addressing.
  a. reset—Disable VME A24 addressing mode.
  b. set—Enable VME A24 addressing mode.
Bit 14. Enable VME extended addressing
  a. reset—Disable VME A24 addressing mode.
  b. set—Enable VME A24 addressing mode.
Bit 15. Enable Mail Box compare
  a. reset—Disable Mail Box hardware from comparing MC bus addresses.
  b. set—Enable Mailbox hardware to compare MC bus addresses.

For the MCS control registers 1 bit definition:
Bit 0. VMEbus parity error.
  a. reset—Will not check parity for outgoing data to VMEbus.
  b. set—Will check for parity error on data and generate BERR signal on VMEbus.
Bit 1. Local bus address parity.
  reset—Will ignore the address parity from the local bus.
  set—Will check the parity for incoming address from local bus.
Bit 2. Local bus control parity.
  reset—Will ignore the control lines parity from the local bus.
  set—Will check the parity for incoming control lines from local bus.
Bit 3. Local bus data parity.
  reset—Will ignore the data parity from the local bus.
  set—Will check the parity for incoming data from local bus.
Bit 4. Async multidrop disable bit.
  reset—Disables the drive capability of this node on the multidrop capability.
  set—Allows this node to drive or receive information on the Async multidrop line.

The MCS status register has the physical address: 0x0052; the access right: read/write; and the transfer type: word. See format diagram below.

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | | | | | | | | | | | | | | | |

The bit definitions for the above are as follows. Bit 0 Global busy.

This status bit indicates that the global busy signal has been driven on the MC bus by some node. This bit will be cleared by reading status register. See note below.

Bit 1 Node busy

This status bit indicates that the local node has driven the global busy. This bit will be cleared by the reading status register. See note below.

Bit 2 MC Bus parity error.

This status condition means a parity error was detected on receiving a transfer from the MC bus. This condition can also be set by the force parity .error control register write. This bit will be cleared by reading status register.

Bit 3 Non-Present Memory (status)

This status bit is set when MC bus addresses a non-existing area of memory. This status can also be set by the force non-present memory error control register write. This bit will be cleared by reading status register.

Bit 4 Overrun error (status)

This status bit is set when the receive FIFOs are full and another bus transfer arrives to an open window. This status can also be set by the force overrun error control register write. This bit will be reset by reading the status register if this condition is set by the encoded force error bits (bits 7 and 8). However, if set by Force MCS FIFO overrun (bit 12) or by an existing FIFO overrun, a software clear or a system reset is needed to reset this status bit. See Note below.

NOTE: If these conditions are forced, by the encoded force error bits (bits 7 and 8), reading the status register will clear these bits if the forced conditions no longer are true.

Bit 5 Local Bus data Parity error

This status bit indicates that data parity on the local bus detected. This status bit will be cleared by reading the status register.

Bit 6 Local Bus control Parity error

This status bit indicates that control parity on the local bus detected. This status bit will be cleared by reading the status register.

Bit 7 Local Bus address Parity error

This status bit indicates that address parity on the local bus detected. This status bit will be cleared by reading the status register.

Bit 8 Mailbox location 0

When set, this bit indicates that a write to mailbox word location 0 has occurred. This bit will be cleared by reading the status register.

Bit 9 Mailbox location 1

When set, this bit indicates that a write to mailbox word location 1 has occurred. This bit will be cleared by reading the status register.

Bit 10 Mailbox location 2

When set, this bit indicates that a write to mailbox word location 2 has occurred. This bit will be cleared by reading the status register.

Bit 11 Mailbox location 3

When set, this bit indicates that a write to mailbox word location 3 has occurred. This bit will be cleared by reading the status register.

Bit 12 Mailbox location 4

When set, this bit indicates that a write to mailbox word location 4 has occurred. This bit will be cleared by reading the status register.

Bit 13 Mailbox location 5

When set, this bit indicates that a write to mailbox word location 5 has occurred. This bit will be cleared by reading the status register.

Bit 14 Mailbox location 6

When set, this bit indicates that a write to mailbox word location 6 has occurred. This bit will be cleared by reading the status register.

Bit 15 Mailbox location 7

When set, this bit indicates that a write to mailbox word location 7 has occurred. This bit will be cleared by reading the status register.

The MC node ID register has the physical address: 0x0054; the access right: read/write; and the transfer type: word. By definition the bits 0 thru 3 of the MC bus node ID register contains the encoded value of MC bus node ID. These values are used by the hardware to generate MC bus request. See format diagram and table below.

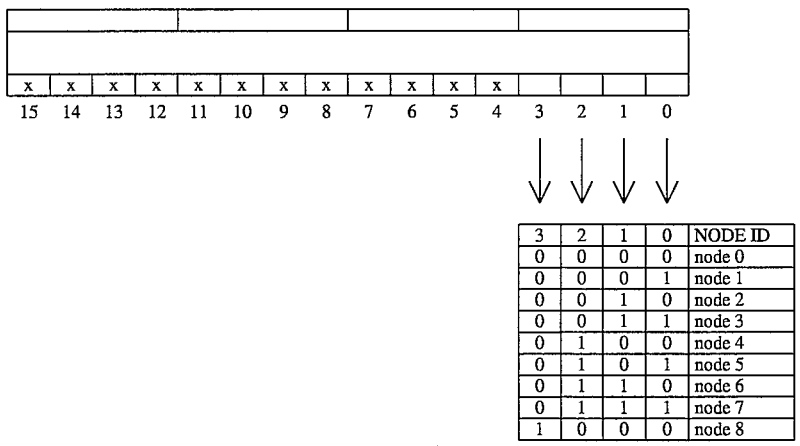

The MCS mailbox registers have the physical address: 0x0056 (mailbox 0) and physical address: 0x0058 (mailbox 1); the access right: read/write; and the transfer type: word. By definition the mailbox address registers contains the value of MC bus address which will be compared with the address of transfer on the MC bus. When a match occurs a flag will be stored with the bus transfer in the receive FIFO. The flag will cause an interrupt when the transfer is stored in the global memory. The compare also occur when the most significant 15 bits of the bus transfer and the next lower 8 bits of the bus transfer are equal to zero. This can provide interrupt to all nodes with one transfer. The mailbox format is shown below.

11 of this register is always 0. This bit indicates that the MCS board 40 is a non-intelligent board. See format below.

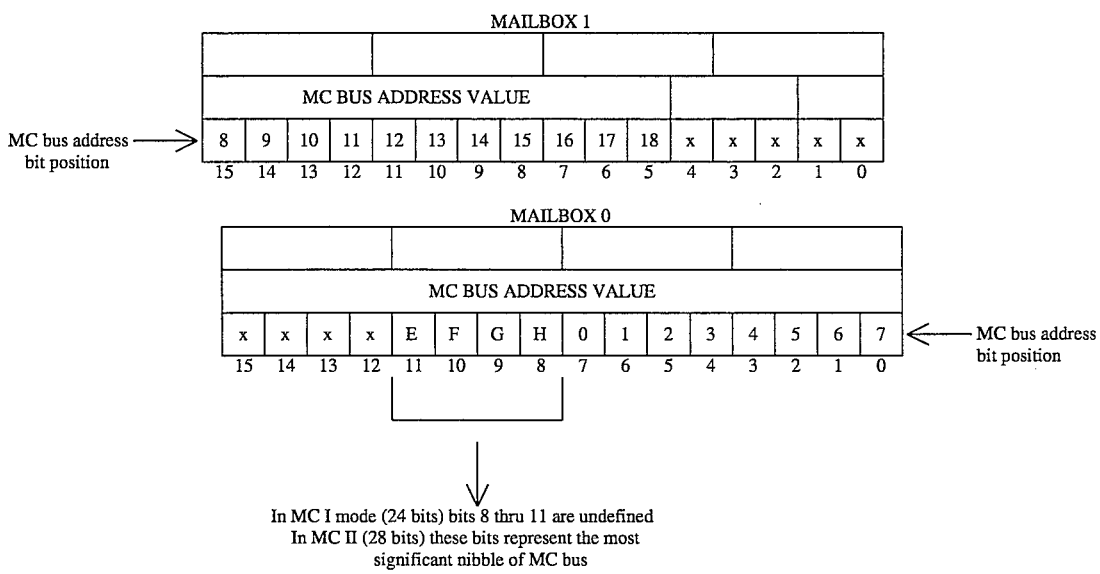

The diagnostic control/status register has the physical address: 0x005A; the access right: read/write; and the transfer type: word. By definition this register is for a diagnostic purpose only. At power on or whenever the system is reset, the bit 14 of this register is set. This bit is cleared by the controlling entity by writing zero to bit 14 of the register. Bit

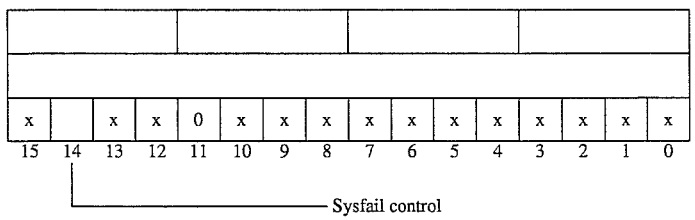

Sysfail control

Figure 12:
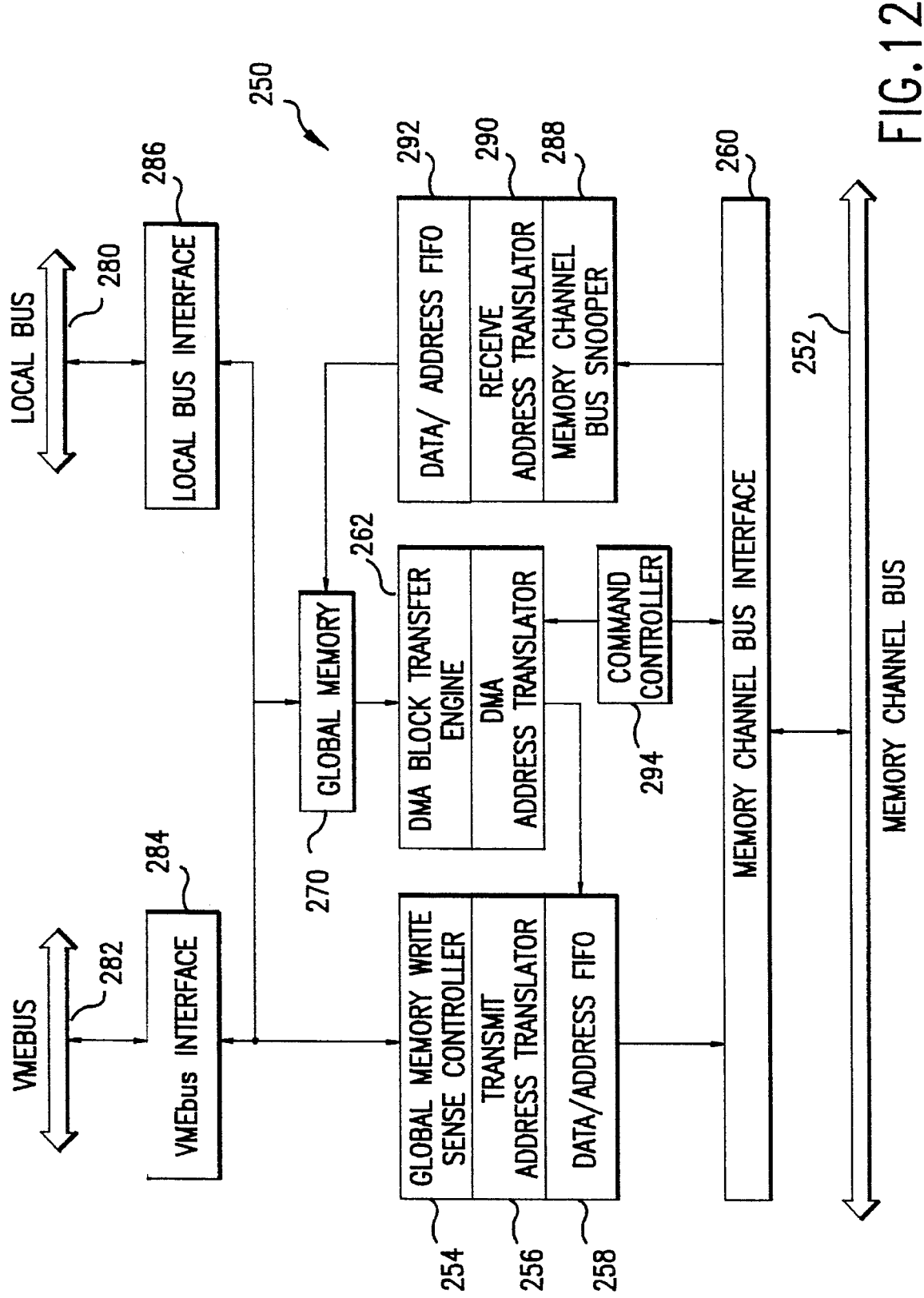
FIG. 12 is a schematic diagram showing details of interfaces and controllers used in a modification of the invention.

Shown in FIG. 12 is a variation of the memory Coupling System earlier described. Like the earlier system, the Memory Channel System of FIG. 12 provides a high-speed, parallel link between the physical memories of all processing nodes in a distributed computing system. The Memory Channel System generally designated as 250 provides the advantages of both Memory Coupling System 40 and a High Speed DMA channel (HSDMA).

The Memory Channel System 250 allows up to nine nodes to maintain a local copy of a common memory area. The data in the selected memory area is common to all nodes connected by the Memory Channel Bus 252. Each node CPU has unrestricted access to its own copy of the common memory area because the copy is maintained in a separate, physical memory in each node. The memory write operations to the selected transmit regions are sensed by the Memory Channel write sense controller 254 and reflected to the separate physical memories at each node over the Memory Channel Bus 252 via transmit address translator 256 and data/address FIFO 258 and via Memory Channel Bus Interface 260.

The Memory Channel High Speed DMA (HSDMA) 262 provides the Memory Channel board 250 with the ability to transfer blocks of data between multiple nodes connected on the Memory Channel Bus. The HSDMA circuitry transfers 64 bits of data at a rate of one transfer per 75 ns clock cycle. This achieves an instantaneous data rate on the Memory Channel bus of 106 Mbytes per second.

The HSDMA 262 provides a programmer's interface via status and control registers, a start address register, a transfer length/burst size register, a translation address register and general purpose I/O.

The Memory Channel system physical link is called the Memory Channel Bus 252. It has a full 32 bit address, 32-bit data path, data and address parity and control signals. The Memory Channel board 250 provides logic needed to attach the Memory Coupling System described and the associated system node to Memory Channel Bus 252. The board incorporates triported DRAM which is used as global memory 270. The writes to this global memory 270 either by local or VME buses 280 and 282, respectively, are monitored and reflected over Memory Channel Bus 252. A VMEbus interface 284 and a local bus interface 286 are provided. To complete the board 250, also provided are a Memory Channel Bus Snooper or receive window 288, Receive Address Translator 290, a DMA Block Transfer Engine and a DMA address Translator 262. The connections are as shown in FIG. 12 and the operation is as described.

HSDMA 262 serves as an accumulator for storing a block of data through several bus cycles. When a command is received from another system or node, the block of data will be released on the command however, the block of data will still be present in the HSDMA 262 even though transferred. A command controller 294 received commands from Interface 260 and delivers a command to HSDMA 262 to release the block of data. The nodes on Memory Channel Bus 252 have variable address comparators controlled by their CPU and have the capability of opening multiple windows to be able to set any window range of addresses desired to receive the block of data from the HSDMA 262. The HSDMA is organized to set the address at the start of transfer so that all 64 lines can carry data, both address and data lines of the bus 252. The principal advantages are higher band widths, control of time on the bus 252 and transfer on demand.

Although the present invention has been shown and described with reference to preferred embodiments, changes and modifications are possible to those skilled in the art which do not depart from the spirit and contemplation of the inventive concepts taught herein. Such are deemed to fall within the purview of the invention as claimed.

What is claimed is:

1. A real time data processing system comprising:
   a plurality of processing nodes; and
   write only reflective data link means for transferring memory writes only between the plurality of processing nodes, including a memory coupling bus connected to each of said plurality of processing nodes,
   each of said nodes having (1) a local bus, (2) a processor coupled to the bus, (3) a memory having at least two means for transferring information to and from the memory so that a first means of said two means couples the memory to the local bus and a second means of said two means couples the memory to the data link means to transfer a memory write from another node to the memory without intervention of said processor, and (4) sensing means connected to the local bus for sensing a write to the memory and then transmitting said write to the memory coupling bus for broadcast to other nodes,
   at least one of said nodes further including a VMEbus connected to a third means for transferring information to and from the memory of said at least one node and adapted for inputting to and outputting from said memory of said at least one of the nodes via said third means, said VMEbus primarily serving to receive input and to provide output for said at least one node.

2. A system according to claim 1 wherein the processor of said at least one of the nodes is also coupled to said VMEbus.

3. A system according to claim 2 wherein an expansion memory is coupled to both the bus included in each of said nodes and said VMEbus.

4. A system according to claim 1 wherein a high speed data interface is coupled to said VMEbus.

5. A system according to claim 1 wherein each said sensing means includes an address range comparator.

6. A system according to claim 1 wherein said sensing means of said at least one of said nodes senses writes to the memory of said node on said VMEbus and said data link means.

7. A system according to claim 6 wherein said sensing means of said at least one of said nodes includes an address range comparator means to control passage of writes from said data link means and from said VMEbus to the memory of said node.

8. A system according to claim 1 wherein each of said nodes further comprises an accumulator means for accumulating a block of data to be released onto the reflective data link means responsive to a command from one of said nodes.

9. A system according to claim 8 wherein the data link means is a further bus having address lines and data lines and wherein each of the accumulator means releases first an address and then the block of data using all address and data lines as data lines.

10. A system according to claim 1 wherein said at least one of said nodes includes a high speed data interface device connected to said VMEbus.

* * * * *